(12) United States Patent
Hergenhan et al.

(10) Patent No.: US 12,338,183 B2
(45) Date of Patent: Jun. 24, 2025

(54) METHOD FOR INTEGRALLY BONDING A GLASS ELEMENT TO A SUPPORT ELEMENT, AND OPTICAL DEVICE

(71) Applicant: JENOPTIK Optical Systems GmbH, Jena (DE)

(72) Inventors: Guido Hergenhan, Jena (DE); Jochen Taubert, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 18/577,543

(22) PCT Filed: Jul. 4, 2022

(86) PCT No.: PCT/EP2022/068390
§ 371 (c)(1),
(2) Date: Jan. 8, 2024

(87) PCT Pub. No.: WO2023/280751
PCT Pub. Date: Jan. 12, 2023

(65) Prior Publication Data
US 2024/0343654 A1 Oct. 17, 2024

(30) Foreign Application Priority Data

Jul. 8, 2021 (DE) ............ 10 2021 117 652.2

(51) Int. Cl.
*C04B 37/04* (2006.01)
*C03B 23/20* (2006.01)
(Continued)

(52) U.S. Cl.
CPC ............ *C04B 37/045* (2013.01); *C03B 23/20* (2013.01); *C03C 3/14* (2013.01); *G01B 11/03* (2013.01); *C03C 27/00* (2013.01); *C04B 2237/68* (2013.01)

(58) Field of Classification Search
CPC ....... C03C 27/046; C03C 37/04; C03C 37/00; C03C 23/02; C03C 27/00; H01S 5/023; H01S 5/02
See application file for complete search history.

(56) References Cited

U.S. PATENT DOCUMENTS 3,635,510 A * 1/1972 Stoller ............... C03C 27/046
428/428
4,848,643 A * 7/1989 Frische ................ B23K 35/001
228/195

(Continued)

FOREIGN PATENT DOCUMENTS

CN 103304129 A 9/2013
DE 10 2016 213 561 A1 1/2018
(Continued)

OTHER PUBLICATIONS

Chinese Office Action dated Jun. 15, 2024 in corresponding application 202280053697.1.

*Primary Examiner* — Erin Snelting
*Assistant Examiner* — Steven S Lee
(74) *Attorney, Agent, or Firm* — Muncy, Geissler, Olds & Lowe, P.C.

(57) ABSTRACT

A method of integrally bonding a glass element to a support element, the method comprising a step of inserting at least one contact element into a contact recess in a surface of the support element. In addition, the method comprises a step of placing the glass element on a portion of the contact element which portion protrudes beyond the surface, and a step of locally heating the contact element in order to connect the glass element to the carrier element via the contact element. The method also comprises a step of coating at least a part of the contact recess with a separating layer prior to the step of insertion.

14 Claims, 5 Drawing Sheets

(51) Int. Cl.
*C03C 3/14* (2006.01)
*C03C 27/00* (2006.01)
*G01B 11/03* (2006.01)

(56) References Cited

U.S. PATENT DOCUMENTS

| | | | | |
|---|---|---|---|---|
| 5,427,599 | A | * | 6/1995 | Greschner ............. C03B 11/086 |
| | | | | 425/389 |
| 8,292,537 | B2 | * | 10/2012 | Newswander ......... G02B 7/008 |
| | | | | 403/30 |
| 9,981,844 | B2 | | 5/2018 | Breymesser et al. |
| 11,271,357 | B2 | | 3/2022 | Bauer et al. |
| 2003/0012537 | A1 | * | 1/2003 | Wu ........................ G02B 6/122 |
| | | | | 385/129 |
| 2003/0221854 | A1 | * | 12/2003 | Natsuhara ............. C04B 37/005 |
| | | | | 174/50.61 |
| 2004/0017004 | A1 | * | 1/2004 | Kasai ..................... H01L 23/055 |
| | | | | 257/E23.19 |
| 2006/0243779 | A1 | * | 11/2006 | Rau ......................... C04B 37/04 |
| | | | | 228/124.1 |
| 2006/0261364 | A1 | * | 11/2006 | Suehiro ................ H10H 20/854 |
| | | | | 257/E33.059 |
| 2007/0246156 | A1 | | 10/2007 | Kohlmann et al. |
| 2015/0144984 | A1 | * | 5/2015 | Chen .................... H10H 20/813 |
| | | | | 257/99 |
| 2017/0069547 | A1 | * | 3/2017 | Peng .................... H01L 21/0234 |
| 2018/0190614 | A1 | * | 7/2018 | Kumar .................... H01L 24/98 |
| 2023/0073405 | A1 | * | 3/2023 | Schroeder ........... H01S 5/04252 |
| 2025/0075303 | A1 | * | 3/2025 | Mehr ...................... F01D 5/28 |

FOREIGN PATENT DOCUMENTS

| | | | | | |
|---|---|---|---|---|---|
| JP | 2004226632 | A | * | 8/2004 | |
| JP | 2005134472 | A | * | 5/2005 | |
| JP | 2005300976 | A | * | 10/2005 | |
| JP | 2014143399 | A | * | 8/2014 | |
| JP | 2018087122 | A | * | 6/2018 | |
| KR | 20050116373 | A | * | 12/2005 | ............. H01L 24/17 |
| WO | WO 2006/034775 | A1 | | 4/2006 | |
| WO | WO-2012029347 | A1 | * | 3/2012 | ........... H05K 5/0239 |
| WO | WO-2020207741 | A1 | * | 10/2020 | ............. C03B 19/14 |
| WO | WO2021074054 | A1 | | 4/2021 | |

\* cited by examiner

METHOD FOR INTEGRALLY BONDING A GLASS ELEMENT TO A SUPPORT ELEMENT, AND OPTICAL DEVICE

CROSS REFERENCE TO RELATED APPLICATIONS

This nonprovisional application is a National Stage of International Application No. PCT/EP2022/068390, which was filed on Jul. 4, 2022, and which claims priority to German Patent Application No. 10 2021 117 652.2, which was filed in Germany on Jul. 8, 2021, and which are both herein incorporated by reference.

The present approach relates to a method of integrally bonding a glass element to a carrier element and to an optical device.

DE 10 2016 213 561 A1 describes a method in which materials with similar expansion coefficients are connected by means of bonding, soldering or welding.

JP2005300976A discloses a method of connecting an optical component to a carrier element. The disadvantage is that the process stability of the method is not guaranteed for certain material combinations.

WO2006/034775A1 discloses a composite structure made of zero-expansion material and a method for the production of such a structure, the disadvantage being the use of an adhesive layer. This can lead to component failure due to ageing.

DISCLOSURE OF THE INVENTION

With this in mind, the present approach presents a method of integrally bonding a glass element to a carrier element and an optical device in accordance with the main claims. Advantageous embodiments result from the respective dependent claims and the following description.

For objects such as positioning apparatus or high-precision length or angle measuring devices, flat glass surfaces are required that are firmly connected to a ceramic carrier. At the same time, the components can be exposed to temperature fluctuations during their processing, production and transport. With the approach presented here, a solid and adhesive-free connection of glass and ceramic can be realized, which can have a flat surface even after process- or transport-related heating during operation at room temperature or another predetermined operating temperature.

A method of integrally bonding a glass element to a carrier element is presented, wherein the method has a step of inserting at least one contact element into a contact recess in a surface of the carrier element. In addition, the method comprises a step of placing the glass element on a portion of the contact element projecting above the surface and a step of locally heating the contact element in order to connect the glass element to the carrier element via the contact element. For example, the glass element can be a titanium-doped quartz glass, which can have a $TiO_2$ content of approx. 20 wt. % or less, for example. In addition, the mean linear coefficient of thermal expansion (CTE) of the glass element can be, for example, 0±30 ppb/° C. from 5° C. to 35° C. with a confidence level of 95% (ppb parts per billion). This is the case with ultra-low expansion glass, for example. The carrier element can be a ceramic carrier, for example made of silicon carbide (SiC), or a metal carrier. Other materials of the carrier element can be, for example, monocrystalline or polycrystalline solids such as silicon (Si), germanium, sapphire, diamond or quartz glass or a mixture of silicon and silicon carbide (Si/SiC), particularly a reaction-bonded, silicon infiltrated silicon carbide material, or boron carbide B4C or silicon infiltrated boron carbide ($SiB_4C$) or AlN or $Al_2O_3$. When connecting the glass element to the carrier element, for example by gluing or soldering, any organic adhesive could bring its typical shrinkage and thermal expansion properties into the stiff and low-expansion structure of silicon carbide and glass. Direct welding, particularly of glass with a very low coefficient of thermal expansion, for example an ultra low expansion glass, and Si/SiC ceramics can be problematic or even impossible due to carbon monoxide formation and additionally or alternatively carbon dioxide formation. The insertion step presented in this method therefore first introduces a contact element, which may for example be designed from glass and accordingly may also be referred to as a glass dowel, into a contact recess in the carrier element. For example, the contact element can be made of the same material as the glass element or of a material with a lower melting temperature than the glass element. For example, the contact element can also be designed as a glass solder body, i.e. a shaped piece of glass solder, advantageously a low-melting solder glass, wherein a stable glass solder can advantageously be used. In contrast to crystallizing glass solders, stable glass solders can behave like conventional glass. When the solder joint is reheated, its softening can show the same temperature dependence as in the previous soldering process. Advantageously, the contact element can have a lower softening temperature than the glass element. In the method presented here, such a contact element or a similar contact element is used to make the connection between the carrier element and the glass element. For this purpose, the glass element is placed on the portion of the contact element or the contact elements, if there are several, that protrude above the surface of the carrier element, wherein an air gap remains between the surface of the carrier element and the glass element. In the local heating step, the glass element can thus be connected to the carrier element with a material bond via the contact element alone or, if several contact elements are provided, via the contact elements. Advantageously, this allows a strong, materially bonded and at the same time adhesive-free connection to be produced, for example between glass and ceramic. In the local heating step, melted material from the contact element can wet the glass element to create a connection in the sense of a soldering process. It is also possible for melted material of the contact element to bond with locally melted material of the glass element in order to create a connection in the sense of a welding process. If several contact elements are provided, the local heating step can be carried out for each of the contact elements in turn. Alternatively, it is possible for several contact elements to be heated locally at the same time, for example using several laser beams. During the local heating step, the carrier element and the glass element, with the exception of the locally heated location, can have room temperature. Alternatively, in the local heating step, the carrier element and the glass element, with the exception of the locally heated location, may have a predetermined temperature, which may correspond to the intended operating temperature of the finished arrangement.

Advantageously, several such contact elements, particularly advantageously at least three, can be provided, which are arranged at a distance from one another. It is particularly advantageous to provide more than ten contact elements.

In accordance with one embodiment, the method may have a step of forming the contact recess prior to the step of insertion. For example, the contact recess can be inserted in the form of a pit in the molding step, for example through a bore. Alternatively, the carrier element, which is designed from ceramic, for example, can be formed with corresponding recesses during the manufacturing process. The advantage of the forming step is that the contact recesses can be optimally matched to the contact element to be inserted in the subsequent insertion step.

The method comprises a step of coating at least part of the contact recess with a separating layer prior to the insertion step. For example, the totality of the surface of the contact recesses into which the contact element is inserted in the insertion step can be coated with the separating layer. The separating layer, which can also be referred to as a barrier layer, can for example be designed with silicon (Si) or germanium (Ge) or a refractory metal and additionally or alternatively an oxide of the aforementioned substances and additionally or alternatively a refractory metal silicide in order to advantageously keep the carrier element, for example designed from silicon carbide, chemically separated from the glass of the contact element. The separating layer can be provided to improve adhesion and additionally or alternatively to prevent a chemical reaction of the glass solder with the carrier element, which could, for example, lead to foaming of the glass solder when it melts.

In accordance with a further embodiment, the method may have a step of heating the contact element to connect the contact element to the carrier element, wherein the step of heating may be performed after the step of insertion. For example, the contact element can be used in a similar manner to a glass solder, which can form a material connection with the carrier element when the temperature rises. For example, the contact element can be heated above the melting temperature of the contact element, which can also be called the glass temperature, transformation temperature or softening temperature, wherein the softened glass can wet the carrier element or the barrier layer covering the carrier element. Advantageously, the carrier element and the contact element or all contact elements provided can be heated together. The heating step can be performed, for example, as a furnace process with a normal melting furnace, such as an industrial furnace with air or inert gas, or a vacuum furnace or by means of a laser beam. The carrier element fitted with the contact elements provided or several carrier elements fitted with contact elements can be inserted into the oven together. Alternatively, the step of heating the contact element in order to connect the contact element to the carrier element can be carried out by local heating, wherein the carrier element otherwise remains at room temperature. Advantageously, the heating step described in this portion can produce a time-saving and cost-effective connection between the carrier element and the contact element. Advantageously, the carrier element with the connected contact elements can be cooled to room temperature after this step. Then the step of reducing the thickness of the portion and additionally or alternatively the step of placing the glass element at room temperature can take place.

In accordance with a further embodiment, in the heating step the portion of the contact element protruding above the surface can be widened as a collar and additionally or alternatively formed as a rounded cap protruding in the direction of the glass plate normal. For example, three quarters of the contact element can be inserted into the carrier element after the insertion step, while one quarter can protrude beyond the surface of the carrier element. In the heating step, the contact element can be heated particularly at the portion protruding above the surface, whereby the portion can expand to form a collar and as a result can have a radius that can be larger than a radius of the contact recesses. Advantageously, this can produce a material connection between the contact element and the surface of the carrier element. Additionally or alternatively, the portion can be formed into a rounded cap during heating. Advantageously, an expansion of the radius of the contact element beyond the edge of the contact recess can be avoided or restricted and, if necessary, the connection between the carrier element and the glass element can be locally limited to a minimum.

In accordance with a further embodiment, the method may comprise a step of reducing a thickness of the portion prior to the step of placing. For example, the portion of the contact element protruding above the surface of the carrier element may be at least partially melted by the previous heating step, as a result of which a contact surface of the portion may have irregularities. Therefore, the contact surface of the portion can be leveled in the reducing step. Advantageously, such an irregular portion can be leveled during the reduction step, for example by means of grinding. A protrusion of the contact element or contact elements over the surface of the carrier element of between 10 µm and 200 µm, for example, can be advantageously achieved. This allows a gap of a determined thickness to be created between the carrier element and the glass element. Residual deformations of the surface of the contact elements in the area of up to a few micrometers, for example up to 0.1 µm, can be removed by a grinding and polishing process, for example. Advantageously, the contact element can be machined in the reduction step in such a manner that the glass element can be placed on a flat surface in the subsequent placement step. In addition, if several contact elements are provided, these can be leveled in such a manner that their flat surfaces lie in a common plane. This allows the glass element to lie flat on the contact element or, if several contact elements are provided, on the contact elements. This allows the connection process and additionally or alternatively the strength of the subsequent connection between the carrier element and the glass element to be optimized. The flatness of both the leveled surface of each contact element and the deviation from the common plane can advantageously be less than 1 µm.

In accordance with a further embodiment, the contact element can be inserted in the insertion step using a reactive welding process. For example, reactive welding can be performed as an alternative to an additional heating step in order to advantageously save time and costs.

In accordance with a further embodiment, the contact element can be heated using a laser beam in the local heating step. For example, a spot thermal connection process such as spot laser welding can be used in the local heating step, wherein the glass dowel (contact element) can be irradiated locally with a laser beam, for example through the glass element, in order to melt the contact element and connect it to the glass element. Advantageously, the contact element can be heated to above its melting temperature, wherein the softened glass of the glass dowel can wet the glass element. During the connection of the glass element to the contact element, the temperature of the carrier element can advantageously remain at room temperature using a laser beam in order to avoid bending during subsequent cooling to room temperature. For example, the connection between the glass element and the contact element can be made by means of a short pulse. This has the advantage that heating is only carried out very locally and heating of the entire component, as in welding or soldering or adhesive tempering, can be avoided. Accordingly, the use of laser welding is particularly advantageous, as this method enables a locally sufficient temperature increase for the welding process by means of short laser pulses while keeping the temperature of the carrier element almost constant. Alternatively, a laser, for example, can be used to start a reactive bonding process.

In accordance with a further embodiment, in the insertion step the contact element can be cylindrical or spherical or partially spherical or ellipsoidal or toroidal in shape. For example, the contact element can be shaped as a glass cylinder, which can be inserted into the contact recess of the carrier element and firmly connected to the carrier element. Advantageously, such a cylinder or one of the aforementioned molds can be produced and stored cost-effectively.

In accordance with a further embodiment, the glass element and the carrier element can be connected in the local heating step to produce an optical device. For example, the optical device can be used as part of a positioning apparatus, for example as an encoder for an xy-table (xy-stage) or as an angle encoder for a goniometer, wherein the material connection between the carrier element and the glass element can advantageously extend the range of use of the optical device and increase its load-bearing capacity.

In accordance with a further embodiment, the method may comprise a step of providing the carrier element in the form of a ceramic element and additionally or alternatively providing the glass element in the form of an ultra low expansion glass and additionally or alternatively providing the contact element in the form of a borosilicate glass element. For example, the carrier element can be designed from silicon carbide (SiC) or silicon nitrided silicon carbide (Si/SiC), as a result of which it can advantageously have a particularly high degree of hardness and high temperature resistance. As so-called ultra low expansion glass, the glass element can advantageously have a very low coefficient of thermal expansion and can be used accordingly in various devices, for example as a carrier for large telescope mirrors in reflecting telescopes. Borosilicate glass, for example, can be used as a contact element for connecting a carrier element to the glass element. The borosilicate glass can, for example, form a material connection with both the carrier element and the glass element, similar to a glass solder. The contact element may have a higher coefficient of thermal expansion than the carrier element, which can lead to mechanical stresses in the event of temperature changes, for example when cooling down after the contact element has been connected to the carrier element, which could lead to the contact element tearing off the carrier element, for example. Contact elements with small dimensions can be used to minimize mechanical stresses to an insignificant level. For example, the largest linear dimension of each contact element can be less than 1 mm. In order to ensure the required strength of the connection between the glass element and the carrier element, a corresponding number of contact elements can be provided. Advantageously, the contact element can have a lower coefficient of thermal expansion than the carrier element. Then, particularly if a cylindrical contact element and a cylindrical recess in the carrier element are provided, a clamping effect of the contact element in the carrier element can be achieved in addition to the material connection. Alternatively, the contact element may have a similar coefficient of thermal expansion as the carrier element, whereby it may experience similar changes in stress as the carrier element when the temperature changes, for example during a welding process or during heating of the contact element in order to connect the contact element to the carrier element. The contact element and the carrier element can remain mechanically stress-free when cooled down together to room temperature of 20° C., for example. Advantageously, when using borosilicate glass, a separating layer can be dispensed with for both the carrier element and the contact element. For the purposes of this paragraph, the coefficient of thermal expansion can be taken as the mean value between the softening temperature of the contact element and room temperature.

In accordance with a further embodiment, a plurality of contact elements can be inserted into a plurality of contact recesses in the surface of the carrier element in the insertion step. In this case, the plurality of contact recesses can be arranged in a line. For example, the plurality of contact recesses can be arranged in the form of a line seam along a closed curve, such as a circle, or along a rectangular shape. Advantageously, the stability of the connection can be increased by using a plurality of contact elements.

In accordance with a further embodiment, a pressure force can be exerted at least temporarily on the glass element during the local heating step in order to press the glass element against the contact element. For example, mechanical pressure can be exerted locally or over the entire surface of the glass element. Advantageously, this can accelerate the connection of the glass element to the contact element. It can also be ensured that the glass element touches the contact element. This ensures that material melted on the contact element during the local heating step can wet the glass element. After wetting the glass element with the locally melted material of the contact element, the contact pressure can be reduced or removed in order to avoid mechanical tension.

In addition, an optical device is presented with a carrier element having a contact recess and a glass element, wherein the carrier element and the glass element are connected to one another by means of a contact element inserted into the contact recess. The optical device may, for example, have been produced using a variant of the method described above. Advantageously, such an optical device can be used in light engines or sensor modules such as optical encoders or other high-precision optical modules. Such a component unit may be required there to ensure the required properties without bending or thermal drift.

In accordance with one embodiment, the optical device may have an optical sensor apparatus for detecting lengths and additionally or alternatively geometric positions. For example, the glass element for this purpose may have a geometric measurement embodiment such as position marks or a scale marker. Advantageously, the optical device can thus be used as a sensory system or as part of such a system, for example as part of an encoder in an xy-stage or as an angle encoder for a goniometer.

Exemplary embodiments of the approach presented here are shown in the drawings and explained in more detail in the following description. Shown are.

In the following description of advantageous exemplary embodiments of the present invention, the same or similar reference characters are used for the elements that are shown in various figures and having a similar effect, wherein a repeated description of these elements is dispensed with.

Figure 1:
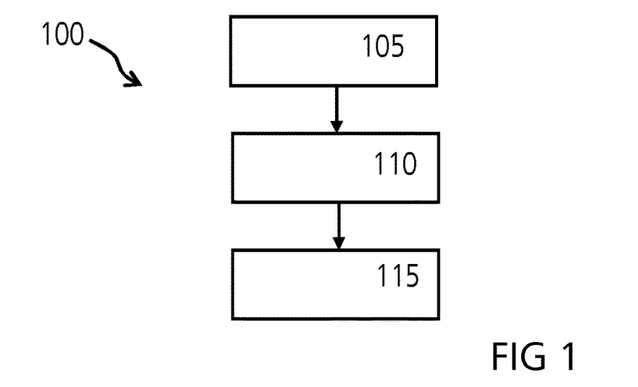
FIG. 1 shows an exemplary embodiment of a method of integrally bonding a glass element to a carrier element.

FIG. 1 shows a flowchart of an exemplary embodiment of a method 100 of integrally bonding a glass element to a carrier element. By way of example only, the carrier element is a ceramic carrier made of silicon-infiltrated silicon carbide (Si/SiC) and the glass element is a glass plate made of so-called ultra-low expansion glass. The Si/SiC can have a coefficient of thermal expansion of only 4 ppm/K between room temperature and 1000° C., for example. The method 100 comprises a step 105 of inserting at least one contact element into a contact recess in a surface of the carrier element. In this exemplary embodiment, the contact element is only inserted using a reactive welding process. In a modification of the exemplary embodiment, an oven process can be used. Furthermore, the method 100 comprises a step 110 of placing the glass element on a portion of the contact element projecting above the surface of the carrier element, wherein only exemplarily the glass plate is aligned parallel to the surface of the carrier element and brought into mechanical contact with the contact element. This results in an air gap between the surface of the carrier element and the glass element. In the following step 115 of local heating, the contact element is heated in order to connect the glass element to the carrier element via the contact element. In this exemplary embodiment, the mechanical connection of the glass element and the contact element is only realized by means of spot welding by means of a laser beam, which indirectly creates a connection between the glass element and the carrier element. The laser beam used here is only set to short pulses for a duration of 10 nanoseconds, for example, in order to heat the contact element and the glass element locally. The use of short pulses makes it possible to heat only very locally and not, as in regular welding or soldering or adhesive tempering, to heat the entire component. In this exemplary embodiment, the glass element and the carrier element are connected in the local heating step in order to produce an optical device.

Figure 2:
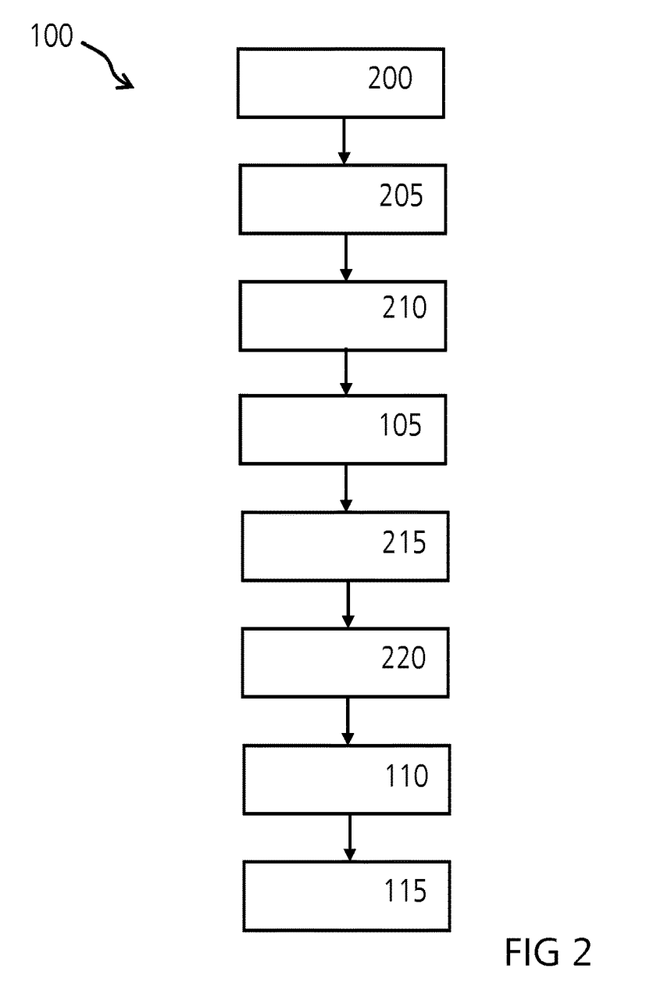
FIG. 2 shows an exemplary embodiment of a method of integrally bonding a glass element to a carrier element.

FIG. 2 shows a flowchart of an exemplary embodiment of a method 100 of integrally bonding a glass element to a carrier element. The method 100 illustrated herein is the same or similar to the method described in the preceding figure, except that method 100 illustrated herein comprises additional optional steps.

In one exemplary embodiment, the method 100 has a step 200 of providing the carrier element in the form of a ceramic element and the glass element in the form of an ultra low expansion glass and the contact element in the form of a borosilicate eat glass element. The contact element is made of borosilicate glass and the carrier element is made of Si/SiC ceramic. In this exemplary embodiment, the borosilicate glass has a different coefficient of thermal expansion between welding temperature and room temperature than the Si/SiC carrier element. For example, the coefficient of thermal expansion of the borosilicate glass is 3.25 ppm/K between room temperature and 300° C. and that of the Si/SiC is 4.0 ppm/K. In this exemplary embodiment, the contact element has relatively small dimensions so that the thermal expansion difference does not lead to the contact element tearing off the carrier element during cooling.

In one exemplary embodiment, the step 200 of providing is followed by a step 205 of forming the contact recess. The contact recess is only inserted into the carrier element by means of a bore, for example, and is matched to the dimensions of the contact element.

In one exemplary embodiment, the contact recess is subsequently coated with a separating layer in step 210 of the coating process. In this exemplary embodiment, the separating layer, which can also be referred to as a barrier layer, is designed with silicon in order to chemically separate the carrier element from the contact element. In another exemplary embodiment, the separating layer may, for example, additionally or alternatively have germanium (Ge) or a refractory metal or an oxide of said substances and additionally or alternatively a refractory metal silicide. In this exemplary embodiment, step 210 of coating is followed by step 105 of insertion of the contact element into the coated contact recess of the carrier element. In one exemplary embodiment, a plurality of contact recesses can also be formed in the surface of the carrier element in the forming step, into which a plurality of contact elements can be inserted in the insertion step. In this case, the plurality of contact recesses can be arranged in a line. For example, the plurality of contact recesses can be arranged in the form of a line seam along a closed curve, such as a circle, or along a rectangular shape.

In one exemplary embodiment, the step 105 of insertion is followed by a step 215 of heating the contact element in order to connect the contact element to the carrier element. For example, the contact element and optionally also the carrier element are heated to a connection temperature that enables a material-locking connection between the contact element and the carrier element. By way of example only, the heating step 215 is performed as a furnace process using a normal melting furnace. In another exemplary embodiment, heating can be performed using a vacuum furnace or by means of a laser beam. In this exemplary embodiment, a portion of the contact element protruding above the surface of the carrier element is expanded as a collar by heating, in which it is merely melted by way of example. Subsequently, the component is cooled in this exemplary embodiment in order to permanently connect the contact element to the carrier element. Since the borosilicate glass element and the Si/SiC ceramic element in this exemplary embodiment have different thermal expansion coefficients, the step 215 of heating, including cooling to only a room temperature of, for example, 20° C., can nevertheless be performed with substantially low mechanical stress by using contact elements of small dimensions. In another exemplary embodiment, mechanical stresses or unevenness can be caused by soldering. During soldering, for example, the totality of the component can be heated to the soldering temperature. When cooling to room temperature, the joining position can be fixed at the solidification temperature of the solder, so that if the expansion coefficients of the soldered parts differ, a thermally induced stress is created by the cooling, which can lead to bending of the surface. The effect is equivalent to bonding, wherein the solidification temperature of the solder can correspond to the glass transition temperature of the adhesive.

In one exemplary embodiment, in the method 100 shown here, the heating step 215 is followed by a reducing step 220. For example, only one thickness of the portion of the cooled contact element protruding above the surface of the carrier element is ground and polished, resulting in a flat surface of the contact element. This removes any remaining deformation of the surface of the contact element. In an exemplary embodiment with a plurality of contact elements, the surfaces of several existing contact elements can also be leveled into a common plane. A flatness of less than 1 µm is only achieved as an example. The glass element is placed on this flat surface facing away from the carrier element in the following step 110.

This is followed by step 115 of local heating to connect the glass element to the carrier element via the contact element. Thereby, in this exemplary embodiment, the step 115 of localized heating is performed using a laser beam. Here, the laser beam is only guided over the surface of the contact element, for example, in order to securely connect the contact element to the glass element. At the same time, in this step 115 of local heating, a pressure force is exerted on the glass element in order to press the glass element against the contact element. The pressure force can be exerted over the entire surface, for example by placing another glass element on the glass element, or only locally in the area of the contact element(s). In this exemplary embodiment, the glass element has a lower coefficient of thermal expansion than the carrier element, although this does not lead to any mechanical stress due to the point-shaped connection between the glass element and the carrier element, which is only created by local heating.

Figure 3:
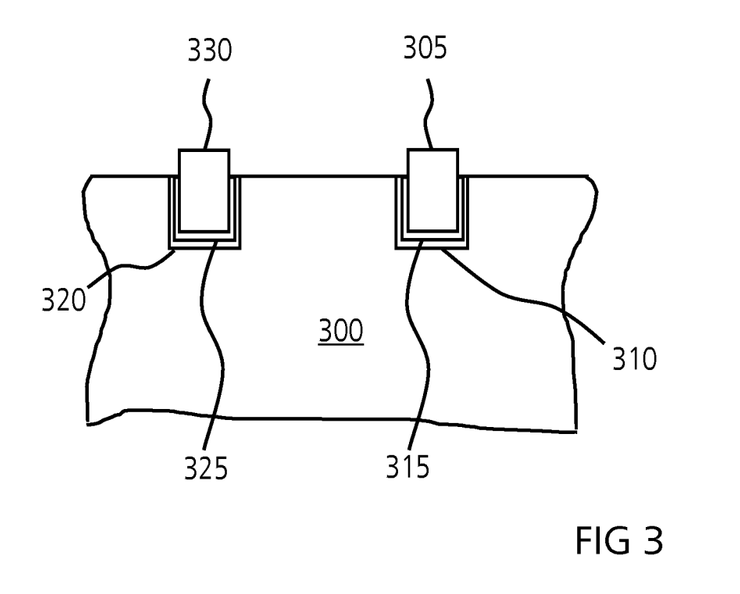
FIG. 3 shows a schematic diagram of an exemplary embodiment of a carrier element with an inserted contact element.

FIG. 3 shows a schematic diagram of an exemplary embodiment of a carrier element 300 with an inserted contact element 305. By way of example only, the carrier element is an element made of Si/SiC ceramic and the contact element 305 is a cylindrical element made of borosilicate glass, which can also be referred to as a glass solder. In another exemplary embodiment, the contact element can also be spherical or partially spherical or ellipsoidal or toroidal in shape. In this exemplary embodiment, the cylindrical contact element 305 is adapted to the shape of the contact recess 310 in which the contact element 305 is inserted. In this exemplary embodiment, the contact recess 310 is coated with a separating layer 315 in order to chemically separate the contact element 305 from the carrier element 300. In this exemplary embodiment, the carrier element 300 also comprises a further contact recess 320 which is coated with a further separating layer 325 and in which a further contact element 330 is inserted. The further contact element 330 is designed to be equivalent to the contact element 305.

Figure 4A:
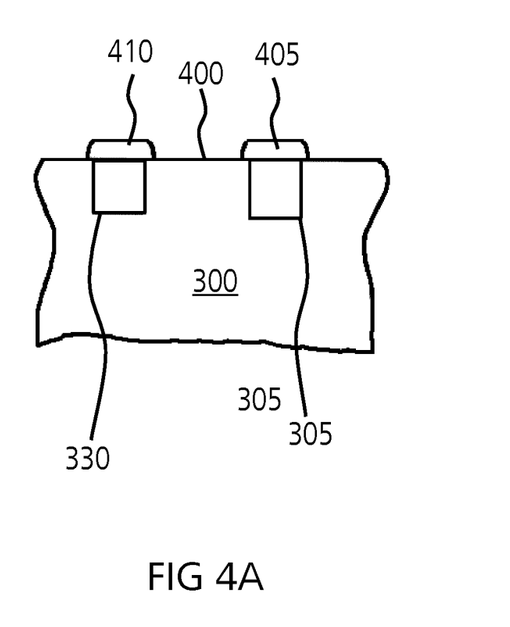
FIG. 4 shows a schematic diagram of an exemplary embodiment of a carrier element with an inserted contact element.
Figure 4B:
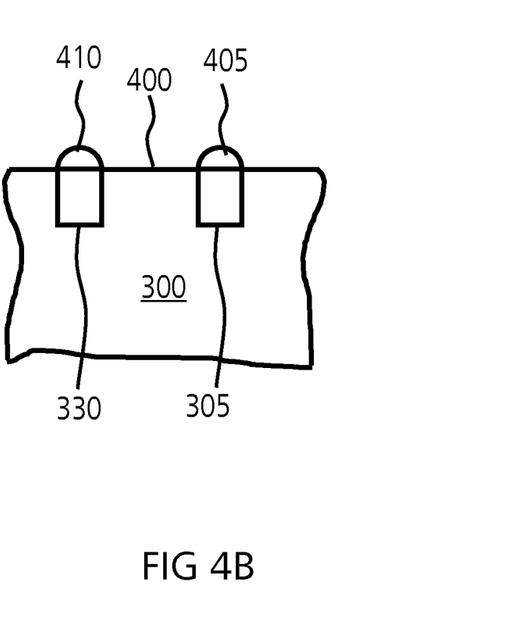

FIG. 4A and FIG. 4B show a schematic diagram of an exemplary embodiment of a carrier element 300 with an inserted contact element 305. The carrier element 300 and the contact element 305 shown here correspond to or are similar to the carrier element and contact element described in the preceding FIG. 3. Different possible shapes of the contact element are illustrated in FIGS. 4A and 4B. In both FIGS. 4A and 4B, the carrier element 300 also comprises in this exemplary embodiment, in addition to the contact element 305 arranged in the contact recess 310, a further contact element 330 arranged in a further contact recess 320. The contact element 305 as well as the further contact element 330 are shown in the figure shown here after a step of heating. In FIG. 4A, due to the heating in this exemplary embodiment, a portion 405 of the contact element 305 projecting above the surface 400 of the carrier element 300 is widened as a collar and connected to the surface 400 by a material bond. Accordingly, a further portion 410 of the further contact element 330 is also widened and connected to the surface 400 by a material bond. In FIG. 4B, on the other hand, both the portion 405 of the contact element 305 and the further portion 410 of the further contact element 330 are shaped as a rounded cap. In other words, in the exemplary embodiment shown here, the two dowels are fused and firmly connected to the carrier element 300.

Figure 5:
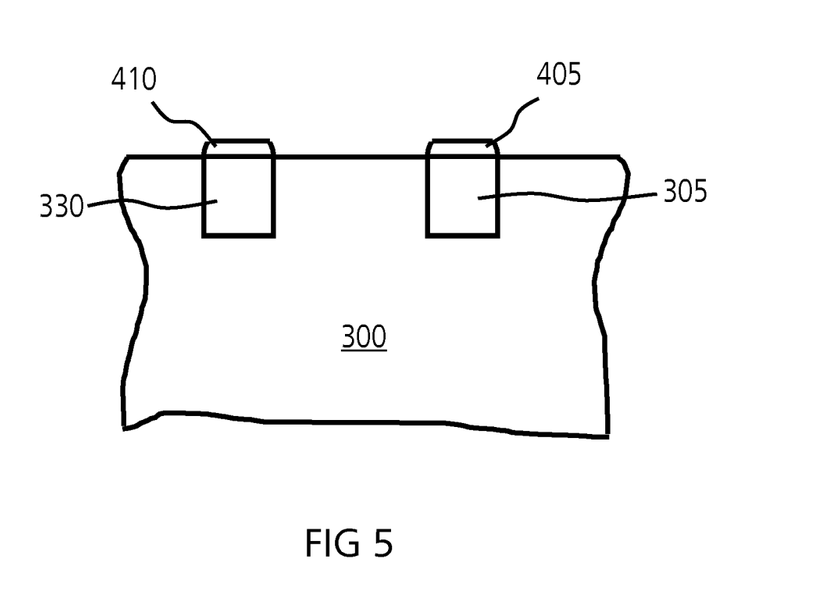
FIG. 5 shows a schematic diagram of an exemplary embodiment of a carrier element with an inserted contact element.

FIG. 5 shows a schematic diagram of an exemplary embodiment of a carrier element 300 with an inserted contact element 305. The carrier element 300 and the contact element 305 shown here correspond to or are similar to the carrier element and contact element described in the preceding FIGS. 3 and 4, wherein the carrier element 305 also has a further contact element 330 in addition to the contact element 305 in this exemplary embodiment. In the representation shown here, the contact element 305 and the further contact element 330 are shown after a step of reducing as described in the previous FIG. 2. Accordingly, the portion 405 of the contact element 305 as well as the further portion 410 of the further contact element 330 is flattened in order to optimize the receptacle of the glass element.

Figure 6:
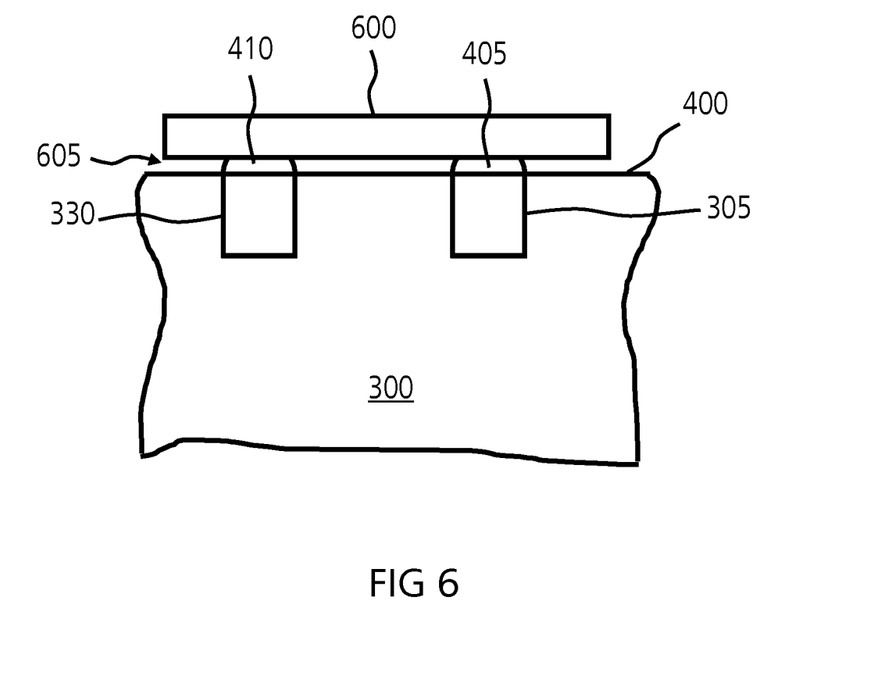
FIG. 6 shows a schematic diagram of an exemplary embodiment of a carrier element with an attached glass element.

FIG. 6 shows a schematic diagram of an exemplary embodiment of a carrier element 300 with an attached glass element 600. The carrier element 300 shown here corresponds to or is similar to the carrier element described in the preceding FIGS. 3, 4 and 5. Contact elements 305, 330 are arranged in the carrier element 300, which were melted in a previous step of heating and leveled in a step of reducing. In the representation shown here, a glass element 600 is placed on the portions 405, 410 of the contact elements 305, 330 projecting above the surface 400 of the carrier element 300. The glass element 600, which may also be referred to as a glass chip or glass plate, is merely an example of a so-called ultra low expansion glass, which has a coefficient of expansion that differs from the coefficient of expansion of the carrier element 300. The glass element is aligned parallel to the surface 400 of the carrier element 300. The thickness of the portions 405, 410 results in an air gap 605 between the carrier element 300 and the glass element 600.

Figure 7:
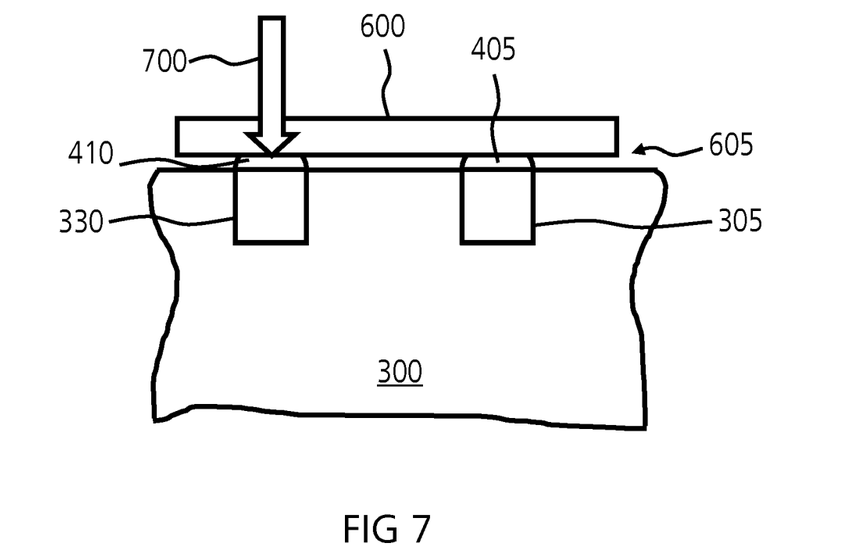
FIG. 7 shows a schematic diagram of an exemplary embodiment of a carrier element with an attached glass element.

FIG. 7 shows a schematic diagram of an exemplary embodiment of a carrier element 300 with an attached glass element 600. The carrier element 300 and the glass element 600 shown here correspond to or are similar to the carrier element and glass element described in the preceding FIG. 6. Here, the carrier element 300, the contact elements 305, 330 and the glass element 600 are represented during a step of local heating. The portions 405, 410 act as a joining surface for attaching the glass element 600. A laser beam 700 is directed through the glass element 600 onto the other contact element 330 in order to heat it locally. Accordingly, the contact element 305 is heated with another laser beam or subsequently by means of the realigned laser beam 700. By heating the contact elements 305, 330 connected to the carrier element 300, the glass element 600 can be indirectly connected to the carrier element 300, wherein the air gap 605 remains between the carrier element 300 and the glass element 600. During local heating, the glass element 600 is pressed onto the contact elements 305, 330 in accordance with an exemplary embodiment.

Figure 8:
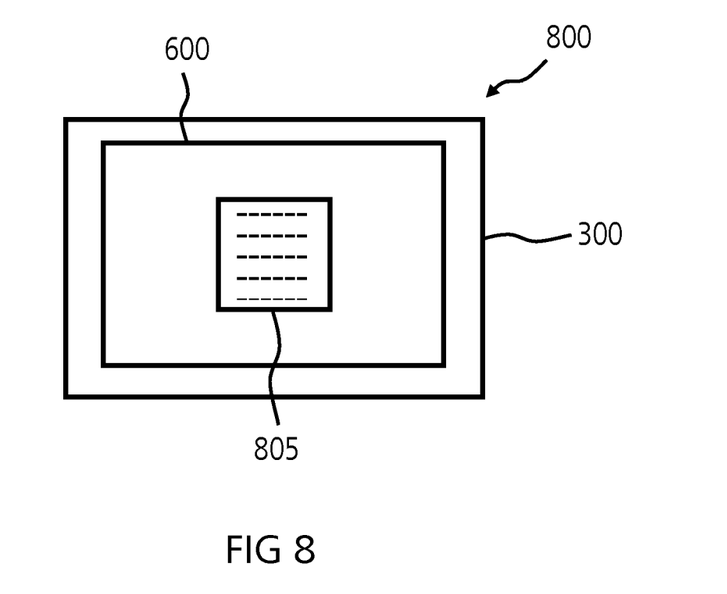
FIG. 8 shows a schematic diagram of an exemplary embodiment of an optical device.

FIG. 8 shows a schematic top view of an exemplary embodiment of optical device 800. In this exemplary embodiment, the optical device 800 comprises a carrier element 300 that is the same or similar to the carrier element described in the preceding FIGS. 3, 4, 5, 6 and 7. The carrier element 300 of the device 800 is materially connected to a glass element 600 by means of a method as described in the preceding FIGS. 1 and 2. In this exemplary embodiment, a sensor apparatus 805 is arranged on the glass element 600, which is merely an example of position markers for determining a geometric position. By way of example only, the optical device 800 is an xy encoder.

Figure 9:
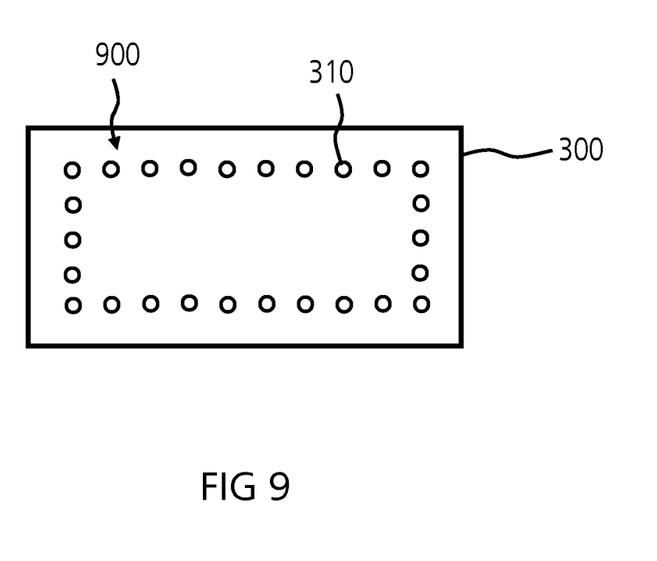
FIG. 9 shows a schematic top view of an exemplary embodiment of a carrier element with an arrangement of a plurality of contact recesses.

FIG. 9 shows a schematic top view of an exemplary embodiment of a carrier element 300 with an arrangement 900 of a plurality of contact recesses 310. The carrier element 300 shown here corresponds to or is similar to the carrier element described in the preceding FIGS. 3, 4, 5, 6, 7 and 8 and has a plurality of contact recesses, all of which are similar to the contact recess described in the preceding FIGS. 3, 4 and 6. In this exemplary embodiment, the arrangement 900 comprises more than twenty, exemplary 26 contact recesses 310 and is only exemplary rectangular in shape. In another exemplary embodiment, for example, twenty or more contact recesses 310 may be arranged along a plurality of rings. For example, an inner ring can have a diameter of 20 mm, a middle ring a diameter of 40 mm and an outer ring a diameter of 60 mm.

The invention claimed is:

1. A method of integrally bonding a glass element to a carrier element, the method comprising:
   inserting at least one contact element into a contact recess in a surface of the carrier element;
   heating the at least one contact element to connect the at least one contact element to the carrier element, wherein the step of heating is performed after the step of insertion, and wherein in the step of heating a portion of the at least one contact element protruding above the surface is widened as a collar and/or formed as a rounded cap protruding in the direction of the glass plate normal;
   placing the glass element on a portion of the at least one contact element protruding above the surface;
   local heating of the at least one contact element in order to connect the glass element to the carrier element via the at least one contact element; and
   coating at least a part of the contact recess with a separating layer prior to the step of insertion.

2. The method according to claim 1, comprising a step of molding the contact recess prior to the step of insertion.

3. The method according to claim 1, wherein the separating layer is made from silicon (Si) or germanium (Ge) or a refractory metal or an oxide of the silicon (Si) or the germanium (Ge) or the refractory metal or a refractory metal silicide.

4. The method according to claim 1, comprising a step of reducing a thickness of the portion of the contact element prior to the step of placing for leveling a surface of the portion of the contact element.

5. The method according to claim 1, wherein in the step of insertion, the at least one contact element is inserted using a reactive welding process.

6. The method according to claim 1, wherein in the step of locally heating the at least one contact element is heated using a laser beam.

7. The method according to claim 1, wherein in the step of inserting the at least one contact element is shaped cylindrical or spherical or partially spherical or ellipsoidal or toroidal.

8. The method according to claim 1, wherein in the step of local heating, the glass element and the carrier element are joined to produce an optical device.

9. The method according to claim 1, comprising a step of providing the carrier element in the form of a ceramic element and/or the glass element in the form of an ultra low expansion glass and/or the at least one contact element in the form of a borosilicate glass element.

10. The method according to claim 1, wherein in the step of insertion, a plurality of contact elements are inserted into a plurality of contact recesses in the surface of the carrier element, wherein the plurality of contact recesses are arranged on a line.

11. The method according to claim 1, wherein in the step of local heating, a pressing force is exerted on the glass element to press the glass element against the at least one contact element.

12. The method according to claim 1, wherein the at least one contact element comprises at least one glass dowel.

13. A method of integrally bonding a glass element to a carrier element, the method comprising:
   inserting at least one contact element into a contact recess in a surface of the carrier element, wherein the at least one contact element comprises at least one glass dowel;
   heating the at least one contact element to connect the at least one contact element to the carrier element;
   reducing a thickness of a portion of the at least one contact element protruding above the surface of the carrier element for leveling a surface of the portion;
   placing the glass element on the portion of the at least one contact element above the surface of the reduced portion;
   local heating of the at least one contact element in order to connect the glass element to the carrier element via the at least one contact element; and
   coating at least a part of the contact recess with a separating layer prior to the step of insertion.

14. A method of integrally bonding a glass element to a carrier element, the method comprising:
   inserting at least one contact element into a contact recess in a surface of the carrier element, wherein the at least one contact element comprises at least one glass dowel;
   heating the at least one contact element using a reactive welding process to connect the at least one contact element to the carrier element;
   placing the glass element on a portion of the at least one contact element protruding above the surface;
   local heating of the at least one contact element in order to connect the glass element to the carrier element via the at least one contact element; and
   coating at least a part of the contact recess with a separating layer prior to the step of insertion.

* * * * *